Jan. 10, 1933.    L. D. SOUBIER    1,894,069
METHOD AND APPARATUS FOR PRODUCING GLASS ARTICLES
Filed April 17, 1929    6 Sheets-Sheet 5
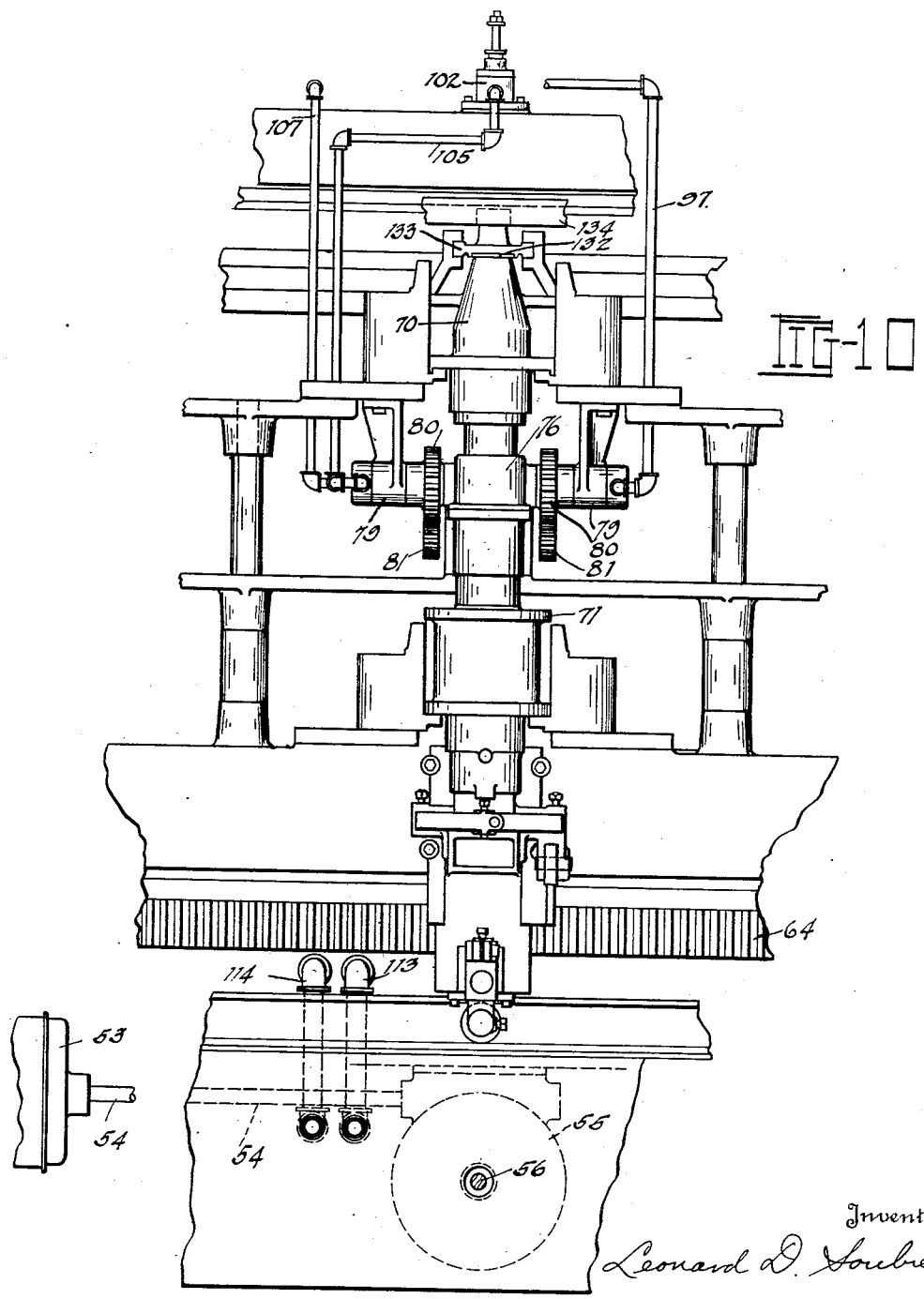
Inventor
Leonard D. Soubier
By J. F. Rule
Attorney Jan. 10, 1933. L. D. SOUBIER 1,894,069
METHOD AND APPARATUS FOR PRODUCING GLASS ARTICLES
Filed April 17, 1929 6 Sheets-Sheet 6
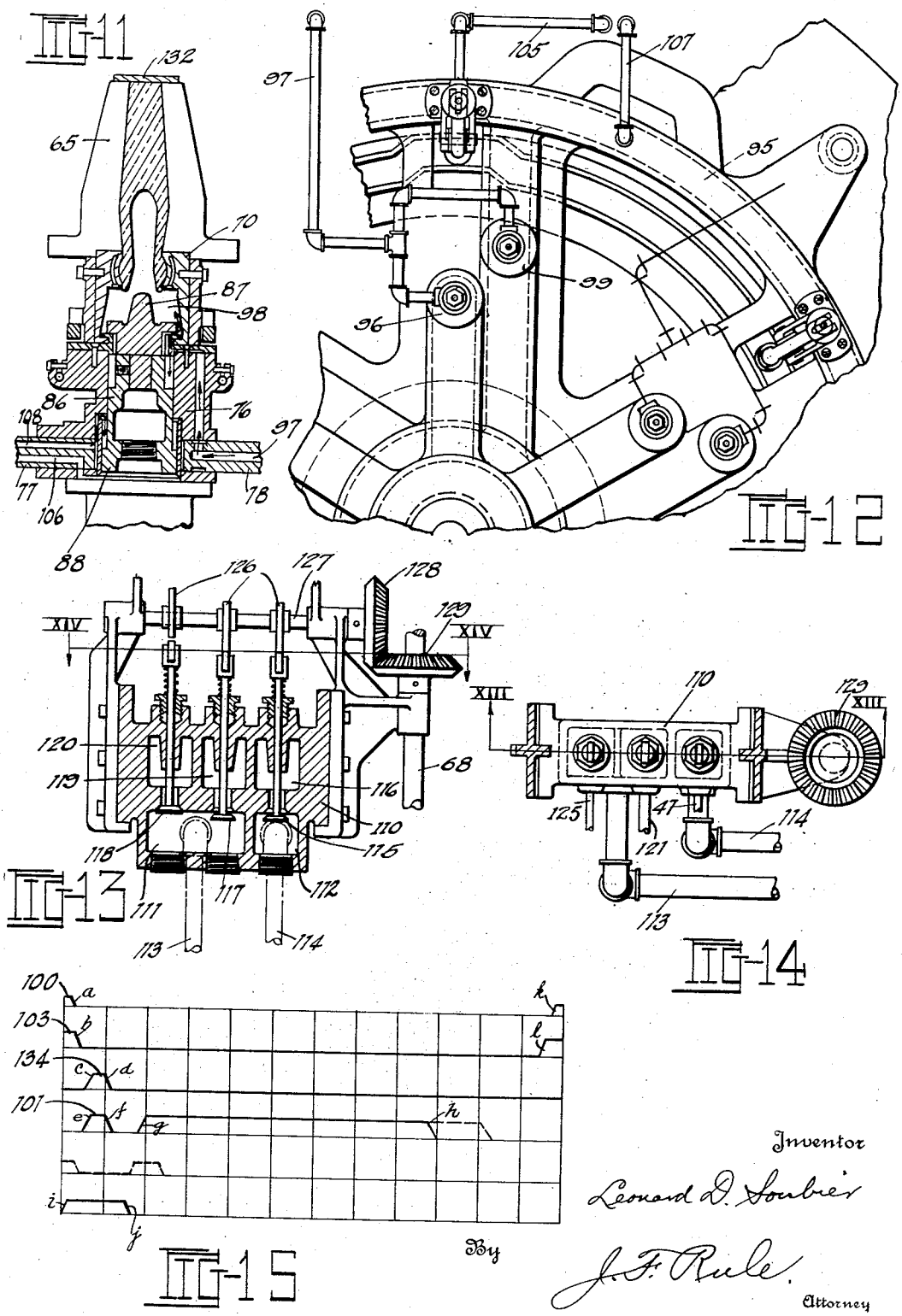
Inventor
Leonard D. Soubier
By J. F. Rule
Attorney Patented Jan. 10, 1933

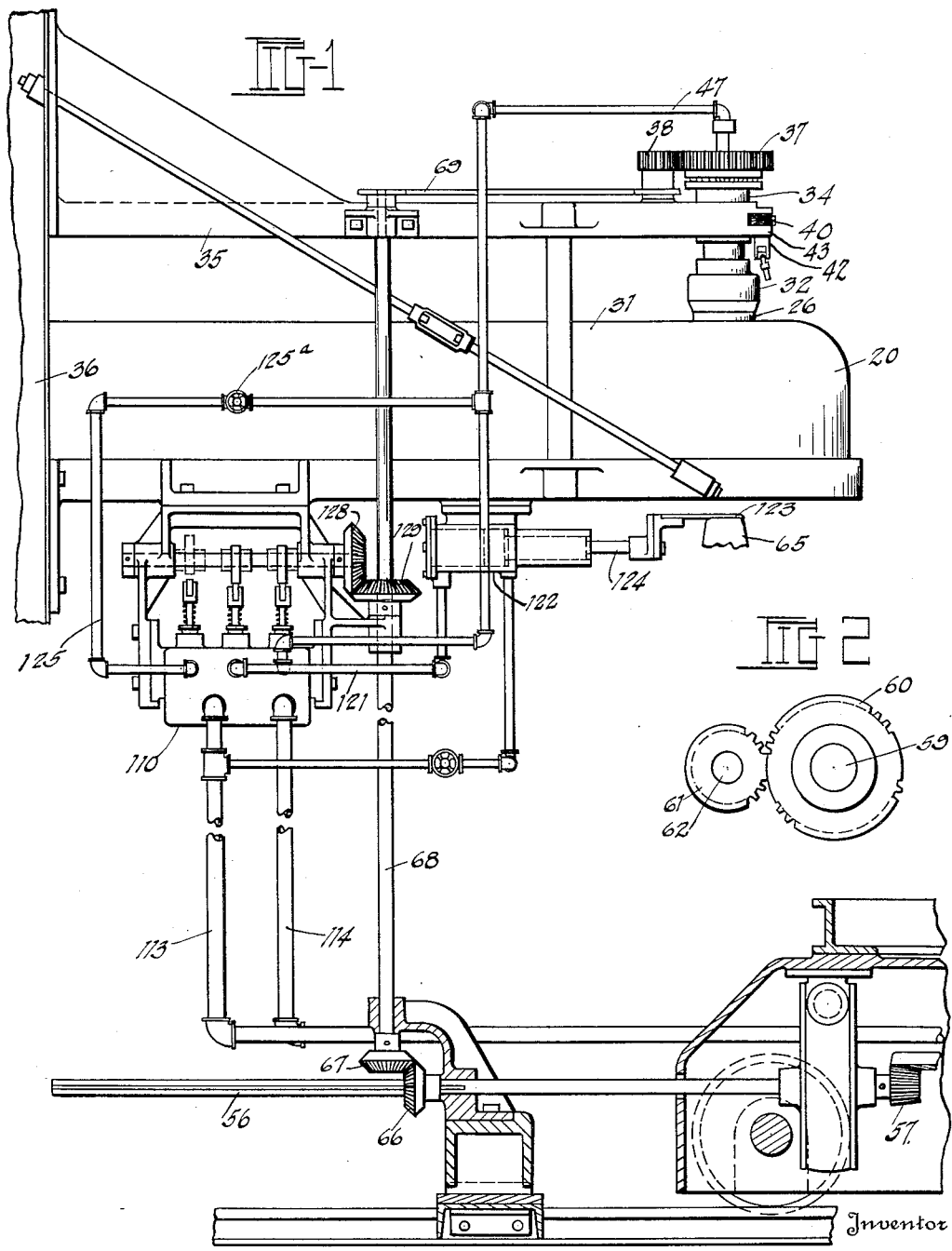

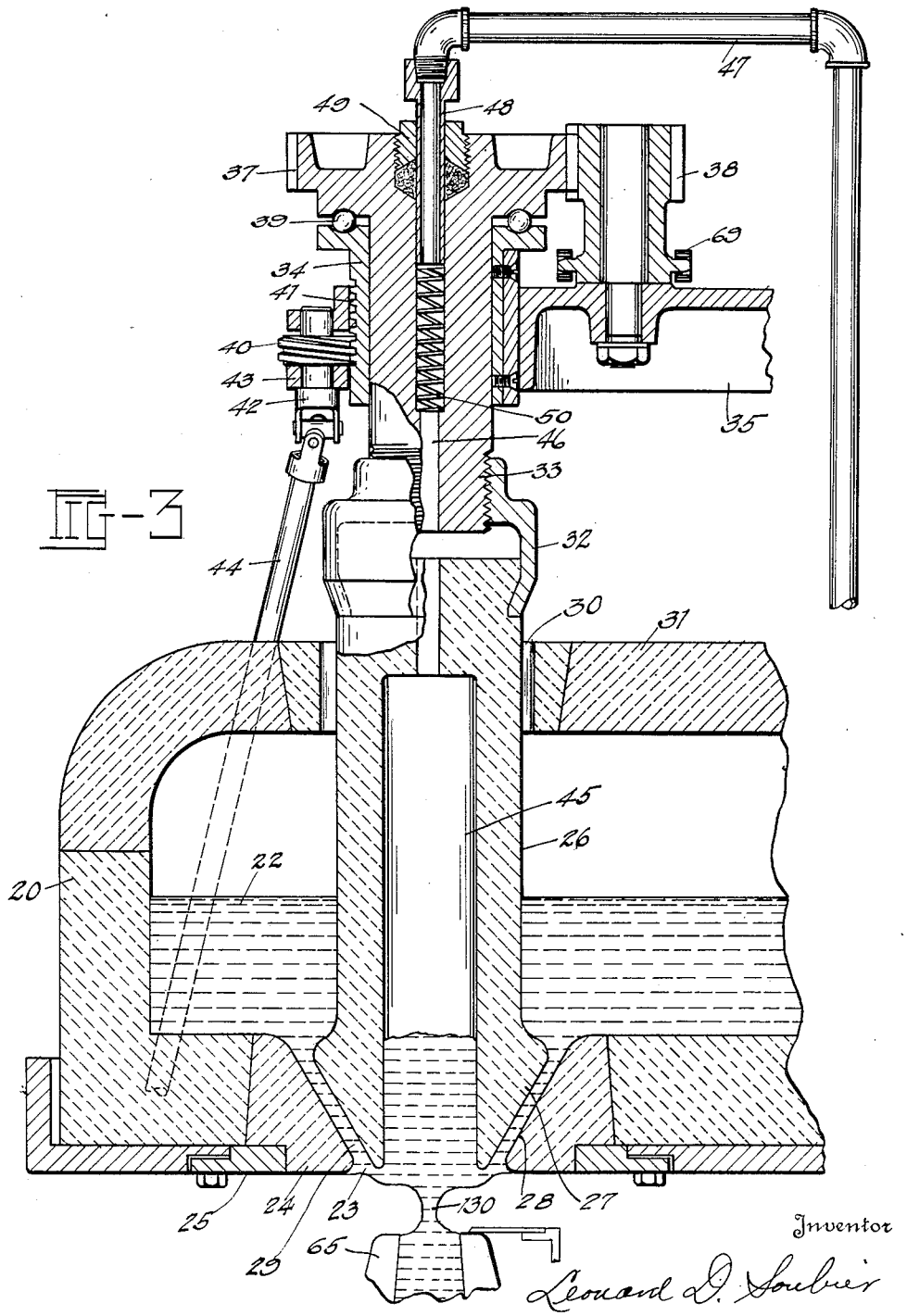

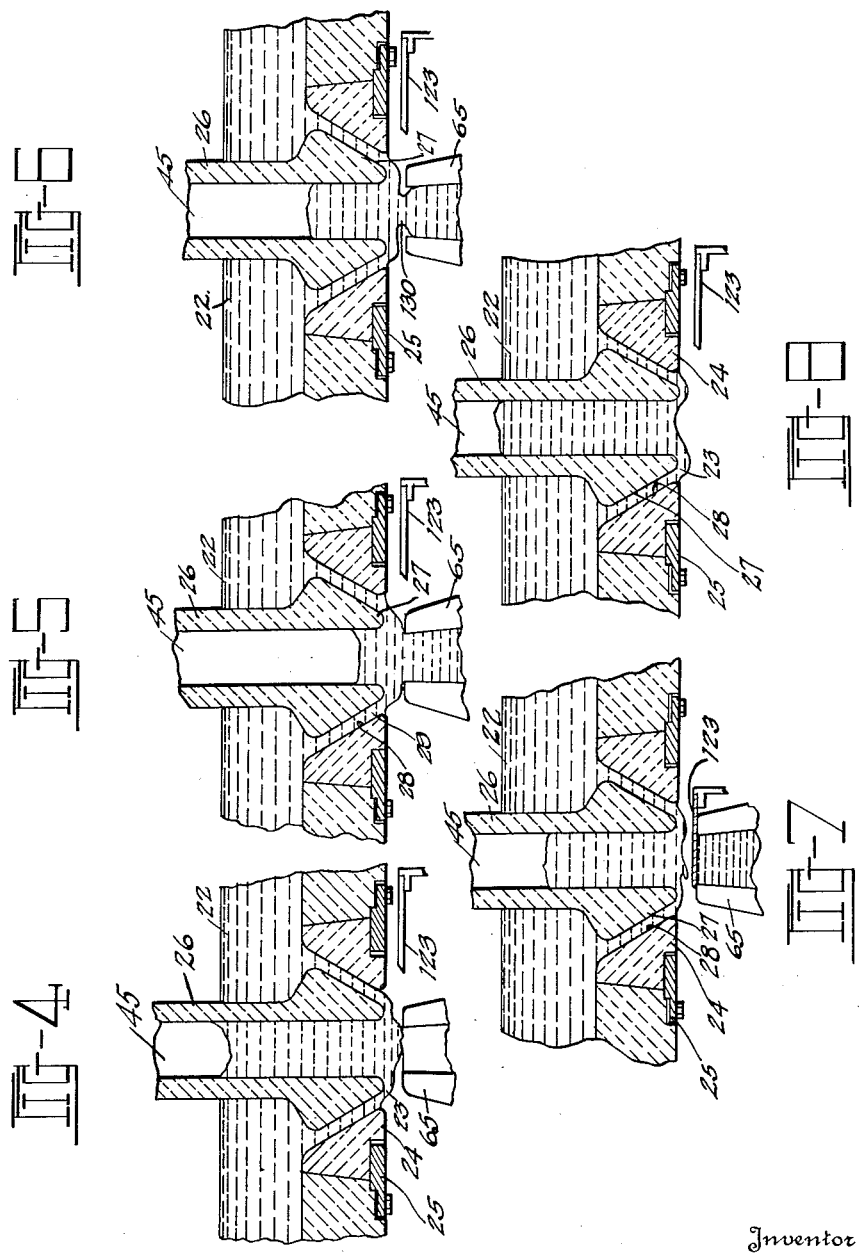

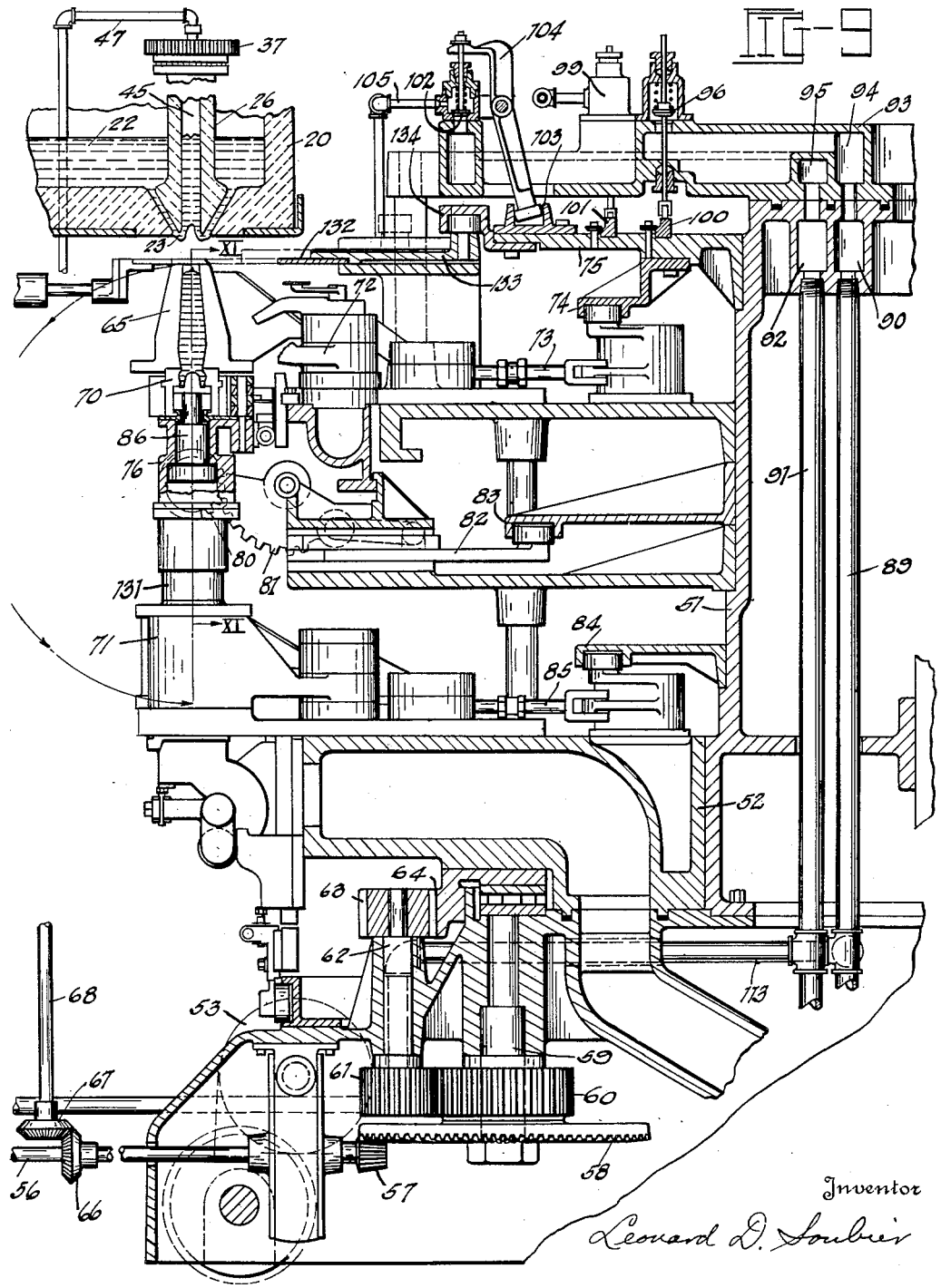

1,894,069

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

METHOD AND APPARATUS FOR PRODUCING GLASS ARTICLES

Application filed April 17, 1929. Serial No. 355,701.

My invention relates to the manufacture of glassware such as bottles, jars and other articles. The invention relates primarily to a method and apparatus by which charges of glass are segregated from a supply body of molten glass and introduced into molds.

At the present time two general methods are in extensive use for delivering charges of glass to the molds of forming machines. According to one of these methods, the lower open end of the mold is dipped downward into a pool of molten glass and filled by suction applied through the upper end of the mold, after which the mold is lifted and the glass in the mold severed from the supply body. In accordance with the other method, the glass is permitted to flow or drop by gravity into the upper open end of an inverted mold. Usually a gob or charge of glass is formed or given a shape approximating or suited to that of the mold cavity and severed from the supply body before being dropped into the mold. Each of these two general methods has important advantages as compared with the other method. An object of the present invention is to provide a construction and method of operation which will combine the advantages of both the suction and gravity feed methods.

In its preferred form, the invention comprises means for bringing a mold or a succession of molds periodically to a charge receiving position in which the upper end of the mold is presented at a bottom outlet of a tank or receptacle containing a supply body of molten glass. The end of the mold is permitted to make sealing contact with the glass and the air is then exhausted from the mold, causing it to be filled with glass by suction, after which the glass is severed by a knife shearing across the end of the mold or operating between the end of the mold and the outlet. Suitable means are provided for controlling and regulating the movement of glass at the outlet and controlling the glass during the intervals between the removal of the filled mold and its replacement by the next succeeding mold.

Other objects of the invention will appear hereinafter.

In the accompanying drawings:

Fig. 1 is an elevation showing a furnace boot or forehearth from which the glass is supplied, and associated mechanism controlling the provision of glass and other operations.

Fig. 2 is a detail view showing gearing for intermittently rotating the mold carriage.

Fig. 3 is a sectional elevation through the forehearth, tube therein, gearing for rotating the tube, and adjusting mechanism.

Figs. 4 to 8 are views illustrating successive steps or stages in the operation of charging a mold.

Fig. 4 shows the relation of parts at the moment the mold is brought into a charge receiving position.

Fig. 5 shows the mold immediately after it has been filled.

Fig. 6 illustrates the necking-in operation as suction is applied within the regulating tube prior to severance.

Fig. 7 shows the relation of parts immediately after the knife has operated.

Fig. 8 shows the knife withdrawn and the glass under the control of the regulating tube after the mold has advanced beyond the charging position.

Fig. 9 is a sectional elevation of a portion of the blowing machine.

Fig. 10 is a front elevation of one of the heads or units of the blowing machine.

Fig. 11 is a section at the line XI—XI on Fig. 9, and shows a parison mold and its blowing head.

Fig. 12 is a fragmentary top plan view of a portion of the blowing machine.

Fig. 13 is a sectional elevation of a valve box and associated parts, the section being taken at the line XIII—XIII on Fig. 14.

Fig. 14 is a section at the line XIV—XIV on Fig. 13.

Fig. 15 shows a cam chart.

Referring particularly to Figs. 1 and 3, a container 20 here shown as a forehearth or extension of a furnace tank, contains a pool of molten glass 22 providing a continuous supply of glass at a bottom outlet opening 23 formed in a bushing 24 of refractory material, the bushing being removably held in place by a ring 25. Within the container 20 is a flow regulating and controlling implement 26 which is tubular in shape and formed at its lower end with a frusto-conical head 27. The inner walls 28 of the bushing 24 are inclined at about the same angle as the opposite walls of the head 27, thereby providing an annular passageway 29, the opposite walls of which are substantially parallel, the walls forming the outer surface of the head 27 being downwardly convergent. The regulator 26 is made of refractory material and extends upward through an opening 30 in the cover 31 of the container, and has secured thereto a metal cap 32, the latter having a screw threaded connection with a stem or shaft 33. The shaft 33 is journalled for rotation in a stationary bearing sleeve 34, said sleeve being mounted in a bracket arm 35 (see Fig. 1) extending outward from the framework 36 which supports the forehearth 20. Formed on the upper end of the shaft 33 is a gear wheel 37 running in mesh with a pinion 38 mounted on the arm 35. The pinion 38 is rotated continuously by means hereinafter pointed out and thereby imparts a continuous rotation to the regulator 26. Bearing balls 39 are interposed between the gear 37 and the bearing sleeve 34. Said sleeve is vertically adjustable in the supporting arm 35 for adjusting the tube 26 up and down. For effecting this adjustment there is provided a worm 40 running in mesh with rack teeth 41 formed on the sleeve 34, said worm being formed on a worm shaft 42 journalled in a bearing 43 on the bracket 35. A rod 44 having a universal joint connection with the shaft 42 is provided with a handle (not shown) by which it may be rotated for adjusting the regulator 26 up and down. There is thus provided means by which the size of the passageway 29 may be conveniently adjusted without interfering with the continuous operation of the regulator.

The regulator 26 is made hollow or tubular, as before noted, to provide a chamber 45 from which the air may be partially exhausted or in which the air pressure may be periodically varied for purposes hereinafter pointed out. A passageway 46 of reduced diameter extends upward from the chamber 45 through the stem 33. A pipe 47 leading from the passageway 46 comprises a section 48 which extends vertically downward into the stem 33. A packing gland 49 is provided to prevent leakage between the pipe section 48 and the shaft 33. A coil spring 50 mounted in the stem 33, bears upward against the lower end of the pipe section 48 and counterbalances the weight of the pipe. This prevents binding of the pipe section 48 within the stem 33 as the latter rotates and also facilitates the adjustment of said stem up or down.

The glass blowing machine, which will now be described, comprises a central stationary column 51 (Fig. 9) on which a mold carriage 52 is mounted for intermittent rotation about the vertical axis of said column. The mold carriage is driven by a motor 53 (Figs. 9 and 10) having a shaft 54 which operates through speed reduction gearing 55 to drive a shaft 56, on one end of which is a pinion 57 running in mesh with a gear 58. The gear 58 is secured to a shaft 59 journalled in the base of the machine. A mutilated gear 60 (see Fig. 2) is secured to the shaft 59 and intermittently drives a pinion 61 keyed to the lower end of a shaft 62, on the upper end of which is a pinion 63 running in mesh with an annular gear 64 on the mold carriage. By means of the gearing just described, intermittent rotation is imparted to the mold carriage, and blank molds 65 thereon are thus brought in succession to a mold charging position beneath the container outlet 23 (Fig. 3) and held at rest in said position while receiving a charge of glass, as hereinafter explained.

Keyed to the shaft 56 (Fig. 1 and 9) is a bevel gear 66 which drives a gear 67 keyed to a vertical shaft 68, on the upper end of which is a sprocket wheel having a driving connection through a chain 69 with the pinion 38, whereby the latter is driven continuously and continuous rotation imparted to the regulator 26.

The mold carriage has mounted thereon an annular series of symmetrically arranged heads or units, each of which comprises a mold group including a body blank mold 65, a neck mold 70 and a finishing mold 71. The blank mold may comprise, as is usual in machines of this type, horizontally separable sections carried on arms 72 having operating connections 73 with a stationary cam 74 mounted on a cam plate 75. The neck mold 70 also comprises partible sections and is positioned directly beneath and in register with the blank mold so that said molds together constitute a parison mold. The neck mold 70 is supported on an inverting head 76 mounted for rotation about the horizontal axis of bearing shafts 77 and 78 (Fig. 11) supported in brackets 79 (Fig. 10). Gears 80 connected to said head intermesh with segmental gears 81. The gears 81 have an operating connection with a slide 82 under the control of a continuous stationary cam 83. After a blank mold has received its charge it is opened by the cam 74, leaving the bare blank projecting upward from the neck mold 70. The cam 83 then operates through the slide 82 and gears 81, 80 to rotate the inverting head 76 and swing the bare parison downward into position to be enclosed within the finishing mold 71. A cam 84 operates through connections 85 to close the finishing mold about the parison.

Within the inverting head 76 (Figs. 9 and 11) is a plunger 86 having a tip 87 which is projected into the neck mold prior to the introduction of a charge of glass, to form an initial blow opening in the parison. The plunger is projected and retracted by means of air under pressure operating on a piston or plunger head 88. After a parison has been formed the plunger is withdrawn and air under pressure supplied to the blow opening formed by the plunger tip, and thereby compacts the glass in the parison mold. Vacuum or suction is employed for drawing the glass into the parison mold in the manner hereinafter explained.

The air and vacuum connections will now be described. Referring to Fig. 9, a vacuum pipe 89 extends from a constant source of vacuum or air at sub-atmospheric pressure to a vacuum chamber 90 formed in the stationary column 51. An air pressure pipe 91 likewise extends from a source of continuous air pressure to an air pressure chamber 92 in the column 51. A distributing head 93 rotating with and forming part of the mold carriage, is formed with a vacuum chamber 94 in constant communication with the chamber 90, and an air pressure chamber 95 in communication with the chamber 92. A vacuum valve 96 (Figs. 9 and 12) controls communication between the vacuum chamber 94 and a pipe line 97 leading from said valve to the trunnion 78 (Fig. 11), the air passage continuing, as indicated by the arrows, to the air chamber 98 surrounding the plunger tip 87. An air pressure valve 99 (Figs. 9 and 12) controls communication between the pressure chamber 95 and the pipe line 97. The valves 96 and 99 are operated respectively by stationary cams 100 and 101 (Fig. 9) mounted on the cam plate 75.

It will be seen that with the connections just described, air pressure and vacuum can be applied within the chamber 98 alternatively by operation of the valves 96 and 99. When the valve 96 is opened, suction will be applied through the line 97 to exhaust the air from the chamber 98 and parison mold as required when charging the latter, as hereinafter explained. This takes place while the plunger tip is projected upward into the neck mold, as shown in Fig. 9. After a charge of glass has been received into the mold, the vacuum valve 96 is closed, the plunger withdrawn to the Fig. 11 position, and the valve 99 is opened to supply air under pressure through the line 97 to the chamber 98 for blowing the parison as shown in Fig. 11.

The plunger 86 is projected upward by air pressure applied beneath the head 88. This pressure is under the control of a valve 102 (Fig. 9) controlled by a stationary cam 103 on the cam plate 75, said cam operating through a lever 104 for opening and closing the valve. When the valve is opened, air under pressure is admitted from the pressure chamber 95 to a pipe line 105 (Figs. 9 and 10) leading to the trunnion 77 and through a passageway 106 (Fig. 11) in said trunnion, and operates to lift the plunger 86. When the valve 102 is closed and the air pressure thereby cut off, the plunger is lowered by air pressure which is continuously maintained through a pipe line 107 (see Figs. 10 and 12) leading from the pressure chamber 95 to the trunnion 77 and communicating with a passageway 108 (Fig. 11) leading through said trunnion for applying air pressure above the head 88.

A timer 110 (Figs. 1, 13 and 14) controls the periodic variation of air pressure within the regulator 26 and also controls the air motor which operates the cut-off knife. The timer comprises a casing having an air pressure chamber 111 and a vacuum chamber 112. A branch pipe 113 extends from the pressure pipe 91 (Fig. 9) to the pressure chamber 111. A branch pipe 114 likewise extends from the vacuum pipe 89 to the vacuum chamber 112. A valve 115 controls communication between the vacuum chamber 112 and a vacuum chamber 116 in the valve box. The pipe 47 extends from the chamber 116 to the regulator 26 so that when the valve 115 is opened the air is exhausted from the chamber 45 in said regulator. Valves 117 and 118 control communication between the air pressure chamber 111 and chambers 119 and 120 respectively. A pipe 121 (Figs. 1 and 14) leads from the chamber 119 to a piston motor 122 which operates a knife 123 attached to the motor piston 124. When the valve 117 is opened, air pressure is supplied through the pipe 121 to advance the motor piston and thereby impart a forward or cutting stroke to the knife 123, said knife being arranged to shear across the upper open end of the blank mold, as hereinafter pointed out. An ordinary double blade shear may be used here if desired. A branch pipe 125 (see Fig. 1) extends from the pressure chamber 120 to the pipe 47 so that when the valve 118 is opened, air pressure is transmitted to the chamber 45 in the regulator 26. A hand valve 125ª permits the air supply through the pipe 125 to be cut off independently of the valve 118 whenever desired. The valves 115, 117 and 118 are actuated by cams 126 on a cam shaft 127 which is continuously rotated by the shaft 68 through intermeshing gears 128 and 129 on the cam shaft and shaft 68 respectively.

The operation is as follows:

The mold carriage is rotated intermittently by the motor 53 (Fig. 10) operating through a train of gears including the mutilated gears 60 and 61 (Figs. 2 and 9) whereby the blank molds 65 are brought in succession to a charge receiving position beneath the container outlet 23 and held at rest in such position while receiving a mold charge. The circular outlet opening 23 may be of substantially larger diameter than that of the mold cavity and the glass under the control of the regulator 26 presents a gathering surface or area with which the receiving end of the mold is brought into sealing contact so that suction may be effectively applied within the mold for filling the mold cavity with molten glass. The control of the glass at the outlet is effected by the combined action of suction or rarefaction of the air within the chamber 45 in the regulator and the continuous rotation of the regulator. This rotation is transmitted from the motor drive shaft 56 through the gearing shown in Fig. 1. While the blank mold is being brought to the charging position, the suction within the regulator 26 is sufficient to hold the glass under control as indicated in Fig. 8.

When the mold has reached a position directly beneath the outlet 23, sealing contact of the glass with the upper end of the mold is effected by a relative vertical movement of the gathering surface of the glass and the mold, preferably by a downward movement of the glass. To produce this downward movement of glass, the vacuum within the regulator is reduced or discontinued when or just before the mold reaches its charging position beneath the outlet so that the glass at the outlet is permitted to sag down and contact with the upper end of the mold. Fig. 4 shows the glass moving downward to make such contact. At the same time or immediately after sealing contact of the glass with the mold, the vacuum valve 96 (Fig. 9) is opened and the vacuum chamber 94 thereby connected through the pipe line 97 (Figs. 10, 11 and 12) to the chamber 98 and the air exhausted from the blank mold 65 and neck mold 70 so that said molds are quickly filled with glass and the neck of the parison formed in the neck mold, the neck pin or plunger 87 being at this time in its projected position within the neck mold.

By reference to Figs. 4 and 5, it will be observed that at the beginning of the mold charging operation there is sufficient glass within the chamber 45 of the regulator to form a mold charge and that most of the charge is drawn directly from this chamber into the mold. A certain amount of glass may also be drawn through the annular passageway 29 directly into the mold, the amount depending on variable factors such as the fluidity of the glass, width of said opening 29 (determined by the vertical adjustment of the regulator), etc. If desired, a regulated amount of air under pressure may be admitted to the chamber 45 during the charging of the mold. This is caused by the opening of the valve 118 (Fig. 13) by its cam 126, thereby admitting air under pressure through the pipe line 125, 47 (Fig. 1) to the chamber 45 (Fig. 3). The air pressure may consist of a puff of air applied by a quick opening and closing of the valve 118 as the mold is brought to charge receiving position. This serves to counteract or break down any vacuum in the chamber 45 and may be sufficient to create a slight momentary pressure on the glass, thereby accelerating the downward movement of the gathering surface into sealing contact with the mold. When operating under conditions which do not require air pressure within the regulator chamber, the air supply is cut off by closing the valve 125ª. After the mold has been filled, air is again exhausted from the regulator chamber 45 by opening the valve 115 (Fig. 13). This causes a flow of glass downward through the annular passageway 29 and upward into the chamber 45 (Fig. 6), at the same time causing a restriction or necking-in of the glass as indicated at 130 just above the mold. The knife 123 is now advanced by its motor 122 (Fig. 1) and shears across the upper end of the mold, thereby severing the glass at the neck-in portion 130. Immediately after the cutting stroke (see Fig. 7) the glass lifts from the knife while a flow of glass into the chamber 45 continues, owing to the partial vacuum within the chamber 45. This flow is maintained until the desired quantity of glass has entered the chamber 45, as indicated in Fig. 8, preparatory to the next filling operation. The vacuum within the parison mold is preferably maintained until after the cutting stroke. After the glass has been severed, the mold carriage rotates and advances the mold to the next station. During this advance, a closure plate 132 (Figs. 9 and 11) on a slide 133 on the mold carriage is projected by a stationary cam 134 to close the upper end of the blank mold. The plunger 86 is also withdrawn in the manner heretofore described and air pressure admitted to the chamber 98 (Fig. 11), thereby compacting the glass in the parison mold. During the advance of the mold carriage after this compacting blow, the blank mold is opened by its cam 74 (Fig. 9) and the head 76 is inverted through the operation of the cam 83, thereby swinging the neck mold 70 downward to carry the bare parison into the finishing mold 71 which is then closed by its cam 84. Following this operation, the neck mold is opened to release the parison and is reinverted. The neck mold and blank mold are then closed preparatory to receiving another charge of glass. After this reinverting of the neck mold, a blowing sleeve 131 is lowered onto the finishing mold 71 and the parison blown to its finished form.

Fig. 15 indicates diagrammatically the preferred order in which the several operations take place in charging a mold, as follows:

When the blank mold is in charging position, suction is applied through the lower end thereof until the point a is reached, when the suction is discontinued. At this time the plunger is in its projected position and when the point $b$ is reached the plunger is withdrawn. At the point $c$ immediately after the plunger is withdrawn, the closure plate 132 is projected to close the charge opening of the mold. The said plate remains in contact with the mold for a short period until the point $d$ is reached, when it is withdrawn. When the point $e$ is reached, the valve 99 is opened to admit air pressure to the mold for the compacting blow which is continued until the point $f$ is reached. It will be noted that the period of this blowing operation takes place while the plate 132 is over the mold and is substantially concurrent with the period during which said plate is in operative position. After the compression blow, the neck mold is inverted to carry the blank into the finishing mold, and at the point $g$ the valve 102 is again opened for the final blow, which is continued until the point $h$ is reached. Vacuum is applied within the regulator chamber 45 at the point $i$. This point is reached while suction is being applied within the mold. The vacuum in the regulator chamber 45 is continued until the point $j$ is reached. At the point $k$, suction is again applied to the mold which has by this time again been brought to gathering position for receiving another charge. The plunger is projected at the point $l$ just prior to the application of suction.

Modifications may be resorted to within the spirit and scope of my invention.

What I claim is:

1. The combination of a container for molten glass having a bottom opening exposing an under surface of the glass, a receptacle open at its upper end to receive a charge of glass, the opening in the receptacle being of less diameter than said exposed surface of glass, means for periodically bringing the open end of said receptacle into sealing contact with said exposed surface of glass without closing said bottom outlet opening, means for causing glass to enter and fill said receptacle, and means for severing the glass.

2. The combination of a container for molten glass having a bottom opening exposing an under surface of the glass, a receptacle open at its upper end to receive a charge of glass, the opening in the receptacle being of less diameter than said exposed surface of glass, means for periodically bringing the open end of said receptacle into sealing contact with said exposed surface of glass without closing said bottom outlet opening, and means for exhausting the air from the receptacle and thereby causing the glass to enter and fill it.

3. The combination of a container for molten glass having a bottom opening exposing an under surface of the glass, a receptacle open at its upper end to receive a charge of glass, the opening in the receptacle being of less diameter than said exposed surface of glass, means for periodically bringing the open end of said receptacle into sealing contact with said exposed surface of glass without closing said bottom outlet opening, means for exhausting the air from the receptacle and thereby causing the glass to enter and fill it, means for severing the glass, and means for preventing discharge of glass from said container except when a receptacle is in position to receive the glass.

4. The combination of a container for molten glass having a bottom outlet opening exposing an under surface of glass free from contact with any object extraneous to said container, means within the container for counteracting the action of gravity on the glass over said surface, a measuring receptacle having an opening in its upper end of less diameter than said bottom outlet opening for the passage of glass into the receptacle, means for bringing said upper end of the receptacle into sealing contact with said exposed surface, and means for causing a charge of glass to enter and fill said receptacle.

5. The combination of a container for molten glass having a bottom outlet opening exposing an under surface of glass, a plurality of measuring receptacles, each having a receiving opening at its upper end, means for bringing said receptacles in succession to a charge receiving position in which the upper end of the receptacle is in direct contact with said surface of glass and the opening in the receptacle sealed by the glass, means for causing glass to enter the receptacle thru said receiving opening and fill the receptacle, the glass in its passage from the bottom outlet opening into the receptacle being free from mechanical contact with extraneous objects, and suction means located above said bottom outlet for preventing an outflow of glass thru the outlet during the interval between the removal of one receptacle from charge receiving position and the bringing of a succeeding receptacle into said position.

6. The combination of a container for molten glass having a bottom outlet opening exposing an under surface of glass, a plurality of measuring receptacles, each having a receiving opening at its upper end, means for bringing said receptacles in succession to a charge receiving position in which the upper end of the receptacle is in direct contact with said surface of glass and the opening in the receptacle sealed by the glass, means for causing glass to enter the receptacle thru said receiving opening and fill the receptacle, the glass in its passage from the bottom outlet opening into the receptacle being free from mechanical contact with extraneous objects, an implement extending downward into the glass over the bottom outlet, and means for rotating said implement.

7. The combination of a container for molten glass having a bottom outlet opening exposing an under surface of glass, a plurality of measuring receptacles, each having a receiving opening at its upper end, means for bringing said receptacles in succession to a charge receiving position in which the upper end of the receptacle is in direct contact with said surface of glass and the opening in the receptacle sealed by the glass, means for causing glass to enter the receptacle thru said receiving opening and fill the receptacle, the glass in its passage from the bottom outlet opening into the receptacle being free from mechanical contact with extraneous objects, a tube extending downward into the glass in said receptacle in register with the bottom outlet, and means for periodically varying the air pressure within said tube and thereby controlling the discharge of glass from the container.

8. The combination of a container for molten glass having a bottom outlet opening exposing an under surface of glass, a plurality of measuring receptacles, each having a receiving opening at its upper end, means for bringing said receptacles in succession to a charge receiving position in which the upper end of the receptacle is in direct contact with said surface of glass and the opening in the receptacle sealed by the glass, means for causing glass to enter the receptacle thru said receiving opening and fill the receptacle, the glass in its passage from the bottom outlet opening into the receptacle being free from mechanical contact with extraneous objects, a tube extending downward into the glass in said container in register with the bottom outlet, and means for periodically applying super-atmospheric and sub-atmospheric pressures to the glass in the tube in synchronism with the movements of the said receptacles and thereby controlling the discharge of glass from the container.

9. The method which consists in providing a supply body of molten glass with a downwardly facing exposed surface, bringing the receiving opening of a receptacle into juxtaposition to said surface and causing the upper end surface of the receptacle to make sealing contact with said exposed surface of glass, causing glass from the supply body to pass directly into said receptacle without contact with any extraneous object during said passage, and thereby fill the receptacle, and severing the glass at said receiving opening prior to any further movement of the receptacle.

10. The method which consists in providing a supply body of molten glass with a downwardly facing exposed surface, bringing the receiving opening of a receptacle into juxtaposition to said surface and causing the walls of said opening and upper end of the receptacle to make sealing contact with said surface, causing glass from the supply body to pass directly into said receptacle without contact with any extraneous object during said passage, and thereby fill the receptacle, severing the glass at the plane of its entrance into said receptacle and leaving a freshly exposed under surface of the supply body, causing the exposed glass to be temporarily sustained by an upward force preventing a gravity flow, and again bringing the receiving opening of a receptacle into sealing contact with said exposed surface.

11. The method which comprises providing a supply body of molten glass having an under surface thereof exposed, bringing the receiving opening of a receptacle into contiguity with said surface and causing sealing contact of the walls of said opening and upper end of the receptacle with said surface, exhausting the air from said receptacle and thereby causing the glass to enter and fill the receptacle, causing a constriction or necking in of the glass immediately above said opening, and severing the glass at said constriction.

12. The method which comprises providing a supply body of molten glass with a downwardly facing exposed surface, bringing the receiving opening of a receptacle into juxtaposition to said surface with the opening spaced a short distance below said surface, causing a downward movement of said surface and thereby causing sealing contact of said surface with the upper end surface of said receptacle, causing a flow of glass into the receptacle, severing the glass at said opening and causing a reformation of said surface preliminary to the presentation of another receptacle.

13. The combination of a container for molten glass having an outlet opening extending thru its floor, a regulating tube projecting downward thru the glass in the container, the lower end of the tube being open and projected into said opening, a receptacle, means for bringing the open receiving end of the receptacle into juxtaposition to the outlet opening, and causing a sealing contact of the glass at said opening with the walls of the receiving opening, means for causing a transfer of glass from the interior of said regulating tube into said receptacle, means for severing the glass between said tube and receptacle, and means for causing an upward flow of glass from said container into said tube thru the lower end thereof.

14. The combination of a container for molten glass having an outlet opening extending thru its floor, a regulating tube projecting downward thru the glass in the container, the lower end of the tube being open and projected into said opening, a receptacle, means for bringing the open receiving end of the receptacle into juxtaposition to the outlet opening, and causing a sealing contact of the glass at said opening with the walls of the receiving opening, means for causing a transfer of glass from the interior of said regulating tube into said receptacle, means for severing the glass between said tube and receptacle, means for exhausting the air from said tube and thereby causing a flow of glass from the supply body into said tube thru the lower end thereof, and means for rotating the tube.

15. The combination with a container for molten glass having a bottom opening exposing an under surface of the glass, of a machine for forming glass articles comprising a mold carriage, a series of molds thereon, means for rotating the carriage about a vertical axis and thereby bringing the molds in succession to a charge receiving position beneath said under surface of glass, each mold when in said position having its upper end open to receive a charge of glass, said end of the mold being of smaller diameter than said bottom opening and exposed under surface of glass, means for causing sealing contact of said end of the mold with the supply body of glass at said under surface without closing said bottom opening, means for drawing a charge of glass by suction into the mold, means for severing the glass, and means for preventing discharge of glass from the said container except when a mold is in said charge receiving position.

16. The method which consists in providing a supply body of molten glass with a downwardly facing exposed surface, bringing the receiving opening of the blank mold into juxtaposition to said surface and causing the walls of said opening and adjacent upper end surfaces of the mold to make sealing contact with the exposed surface of the glass, and causing glass from the supply body to move directly into the mold without contact with any extraneous object during said movement.

17. The method which consists in providing a supply body of molten glass with a downwardly facing exposed surface, bringing the receiving opening of the blank mold into juxtaposition to said surface and causing the walls of said opening and adjacent upper end surfaces of the mold to make sealing contact with the exposed surface of the glass, causing glass from the supply body to move directly into the mold without contact with any extraneous object during said movement, causing upward movement of the exposed portion of the supply body of glass to thereby cause a necking in of the glass immediately above the mold, and severing the glass at the necked in point.

Signed at Toledo, Ohio, this 13th day of April, 1929.

LEONARD D. SOUBIER.